Sept. 5, 1933.   W. J. BRENNEN   1,925,297
OVEN REGULATOR
Filed April 21, 1930
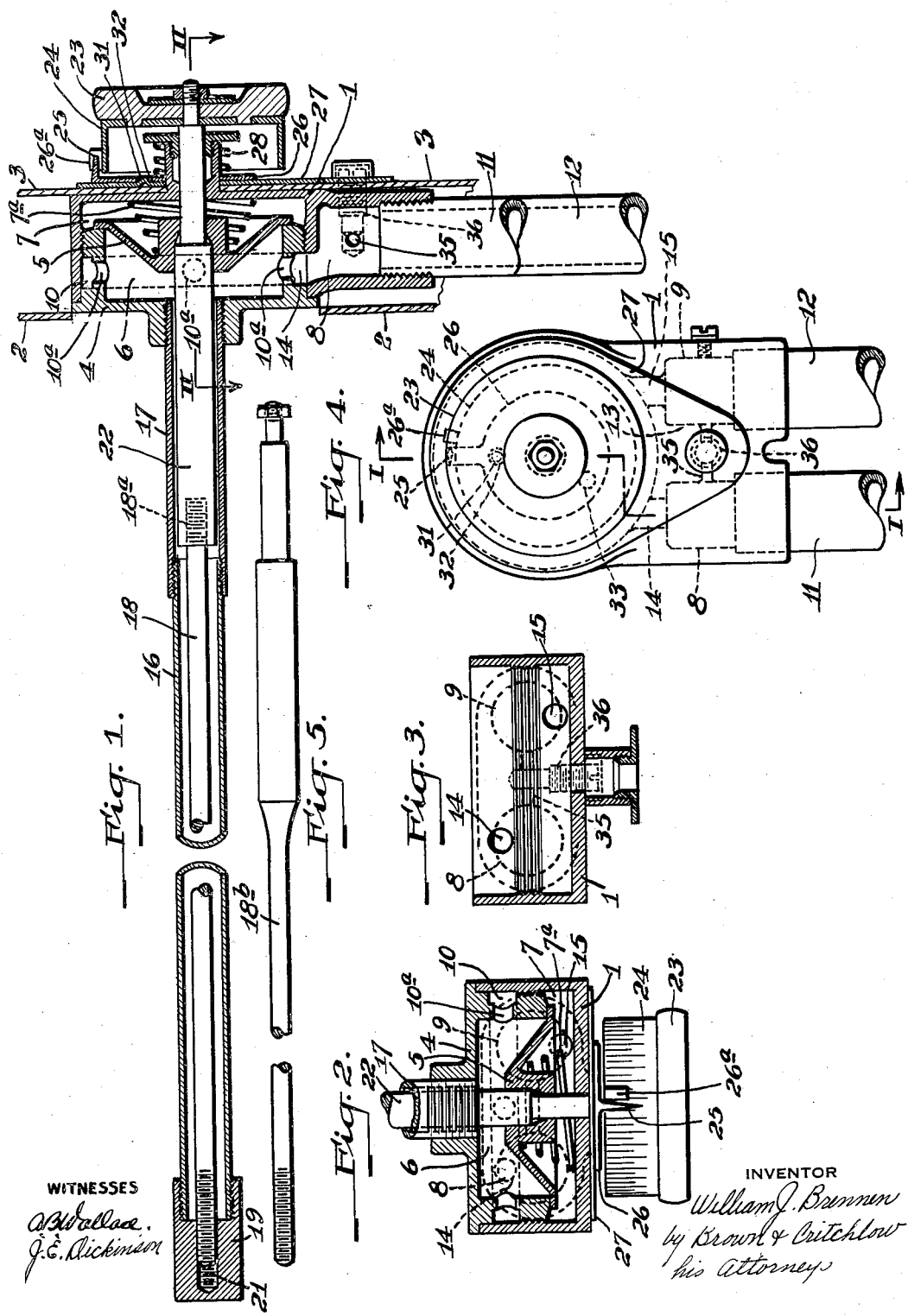
WITNESSES
INVENTOR
William J. Brennen
by Brown & Critchlow
his Attorney Patented Sept. 5, 1933

1,925,297

UNITED STATES PATENT OFFICE 1,925,297

OVEN REGULATOR

William J. Brennen, Scottdale, Pa.

Application April 21, 1930. Serial No. 445,892

4 Claims. (Cl. 236—15)

This invention relates to thermostatic control devices for heating chambers generally, and more particularly to thermostatically operable fuel regulating means for stove ovens and the like.

It has been the customary practice in the past to employ thermostatically operable control devices of this character for regulating the temperature in stove ovens and heating chambers of that nature which are made up chiefly of a main body structure including a valve and adjusting mechanism to which the thermostatic elements are attached, and which is usually mounted on the outside of the oven. The thermostat elements themselves are usually secured directly to this body structure and extended through the oven walls into the interior of the oven. The mass of such structures is generally considerably greater than that of the thermostat elements and is usually subjected to the action of various heat conducting influences which cause it to heat up much slower than the thermal elements. As a result of this, and the direct contact between it and the thermal elements, considerable heat is conducted away from the thermostat elements adjacent to it after the heat is applied to the oven before it becomes heated to the temperature of the thermostat. Accordingly the accurate operation of the thermostat is thus materially delayed after the heating of the oven is started, and for many purposes such operation is quite unsatisfactory.

By mounting the body portion of such devices on the outside of the range or stove wall proper, as well as on the outside of the stove oven, the faults referred to above are to some extent eliminated, but by no means completely. However, where such practice is resorted to the exposed parts have to be designed in very neat and attractive form, and usually nickel plated or otherwise highly polished to meet with the demands of the buying public. This materially adds to the cost of their manufacture and in no way increases their efficiency or utility.

To overcome these disadvantages and undesirable features of the older forms of thermostatic devices of this character, it is the primary object of this invention to provide a thermally operable control device for use in gas ovens and the like in which provision is made for rendering the operation of the thermostat elements free from the influence of the temperature conditions in and adjacent to their supporting structure and the walls of the oven at the point where they enter it.

Another object is to provide a control device of this character which is simple of construction, dependable and accurate in operation, and so designed for use in the ovens of gas ranges that its operating parts may be readily removed for cleaning and repairing from the inside of the oven.

A further object is to increase the beauty of a range by employing such a device eliminating the necessity of having other than merely the temperature adjusting means of the device exposed on the exterior of the range.

A still further object is to provide in such a thermostat for readily and easily checking the calibration of its temperature indicating and adjusting mechanism.

These and other objects as well as its various other novel features and advantages will become apparent when the following detailed description is read in conjunction with the accompanying drawing, of which Fig. 1 is a sectional view taken through an oven regulator constructed in accordance with the invention; Fig. 2 a horizontal section taken on the line II—II of Fig. 1; Fig. 3 a sectional view similar to Fig. 2 showing the body structure with the valve, thermostat elements, and back wall removed; Fig. 4 a front elevational view of the assembled structure; and Fig. 5 a view to reduced scale of a modified form of valve actuating rod.

Referring to the embodiment of the invention illustrated in the drawing, the numeral 1 designates a valve casing which forms the main body and supporting structure of the thermostat as well as the walls of the valve chambers. In its preferred form this casing is so designed as to permit its being mounted between the oven wall 2 and the outer stove or range wall 3. For simplicity of construction and assembly, as well as to facilitate access to the valve, the rear wall of the casing is made up of a cap-shaped covering 4 which is designed to screw into the casing and forms a seat for a disk-shaped valve 5. This valve is adapted not only to control the fuel passing through the casing, but also to divide the casing into an inlet chamber 6 and an outlet chamber 7, and is normally biased to its closed position by a helical spring 7a. Communicating with these two chambers and extending through the lower part of the casing there are provided a pair of passages 8 and 9 into which pipes 11 and 12 employed for conducting gas from any suitable source of supply through the regulator to the oven burners are fitted. The upper ends of these two passages terminate in an end wall 13 which has two ducts 14 and 15 formed in it near the rear edge of passage 8, and the front edge of passage 9, respectively, that places the passages in communication with the inlet and outlet chambers 6 and 7.

In registration with duct 14 there is formed about the periphery of the end wall member 4 an annular groove 10 which permits the gas to pass from the duct 14 about the end member, and at spaced intervals about this groove there are provided openings 10a whereby the gas is allowed to pass from the groove into the inlet chamber 6.

To automatically operate valve 5 in such a way as to maintain a predetermined temperature in the oven, a thermally responsive tube 16 having a relatively high coefficient of expansion is employed. This tube is extended into the oven and spaced at a distance from the valve casing proper as well as the oven wall by means of what is termed a compensating expansible tube 17. This latter tube is preferably made of some material having a relatively low coefficient of expansion and conductivity, and of such length that the heat conditions in and adjacent to the supporting structure or casing 1 of the regulator, which normally heats up much slower than the thermally responsive tube extending into the oven, will have no effect upon the operation of the tube 16.

These tubes may be made of any suitable material, metal or alloy having the desired relative coefficients of expansions, such as iron, steel, brass and the like.

Within the thermal tube 16 there is provided a rod 18 for transmitting the movement of the tube to valve 5 which is formed of some suitable non-expansible material, or material such as invar metal having a very low coefficient of expansion. This rod is preferably made of substantially the same length as the tube 16, and is attached to the tube by means of a cap 19 which is rigidly secured to the end of the tube and provided with an internal thread 18a for the reception of the end of the rod. Between the end of the rod and valve 5 there is arranged a compensating rod 22 made of some suitable material having a coefficient of expansion which renders it susceptible of expanding and contracting to such an extent through the influence of the heat to which it is subjected as to just compensate for the movement of the tube 17. By reason of this arrangement valve 5 is rendered responsive to the movement of the thermostat tube 16 alone, and the temperature conditions in the supporting structure of the regulator have substantially no effect upon its operation. Consequently, the regulator is adapted to function accurately from the instant the heat is turned on in the oven instead of being delayed until the whole regulating structure is heated up to a sufficient degree to provide a uniform temperature throughout, as is necessary in the older forms of devices of this character, especially where the whole device is placed inside of an oven.

In order to provide for adjusting the thermostat so that different predetermined temperatures may be maintained in the oven, rod 18 is fitted loosely in the thread 21 of cap 19, and the valve engaging end of rod 22 is passed in a gas-tight manner through valve 5 and the wall of the stove so that it may be manipulated from the exterior of the stove. A regulating wheel 23 is firmly fitted on the exterior end of rod 22 to facilitate its turning so that it may be adjusted with ease by merely turning the wheel.

For indicating the temperature in the oven as determined by the adjustments of the thermostat, a cylindrical dial 24 calibrated in terms of degrees is attached to wheel 23, and a pointer 25 for indicating the reading on the dial is formed on a disk 26 held against a plate 27 rested against the stove wall by a spring 28. The pointer extends over the face of the dial 24 in such a way as to engage a stop 26a on the dial when turned to its off position. To prevent the disk 26 from rotating, a small raised portion 31 is made on plate 27, which is adapted to fit in a hole 32 formed in the disk.

For checking the calibrations on the dial 24, a second hole 33 is formed in disk 26 and spaced from hole 32 such a distance that when the disk 26 is turned so that point 31 registers in the hole 33 and the dial 24 is turned to indicate the room temperature, the valve will just close, thus providing a cold check for the thermostat.

To provide a by-pass for the gas about valve 5 so that when the valve 5 is entirely closed sufficient quantity of gas will be permitted to enter the burners to sustain a pilot light, a bleeder passage 35 is extended from passage 8 to passage 9 in casing 1, and in it a plug type valve 36 is fitted for regulating the bleed flow.

To modify the invention as indicated in Figure 5, the thermostat rod 18 may be made in one piece 18b, providing it is made of non-expansible or very low expansible material throughout, and compensating tube 17 is made of the same material.

One advantage of a control device constructed in accordance with this invention, as set forth hereinbefore, is that it is adapted to operate accurately from the instant the gas is turned on in the oven, hence eliminating any delay. Another advantage is that it may be mounted inside of the stove wall without sacrificing any accuracy in operation, hence its parts are rendered invisible and consequently need not be highly polished or otherwise formed at added manufacturing expense to enhance its appearance for sales purposes. Also, it has the advantage that it may be readily cleaned and repaired through the removal of its valve and other parts from within the oven.

According to the provisions of the patent statutes I have explained the principle and mode of operation of my invention, and have illustrated and described what I now consider to be its best embodiments. However, I desire to have it understood that, within the scope of the appended claims, the invention may be practiced otherwise than as specifically illustrated and described.

I claim:

1. An oven regulator, comprising a valve casing, a detachable inner end wall member mounted in said casing and forming a valve seat thereon, a valve seated on the inner end of said member and dividing said casing into an inlet and an outlet chamber, an expansible tube secured to said end wall member, an expansible rod connected to said valve and extended a distance into said tube, and a non-expansible rod arranged in said tube beyond said expansible rod with one end engaging the latter and the other attached to the outer end of said tube.

2. An oven regulator, comprising a casing adapted to be secured between the oven wall and outer wall of a stove, a removable valve disposed in an opening between an inlet and outlet chamber in said casing, a detachable inner end wall in said casing, and a thermostat arranged to extend into an oven mounted on the detachable end wall and coupled to said valve, said end wall being susceptible of removal to afford easy access to and removal of said valve from the inside of an oven.

3. An oven regulator, comprising a heat controlling unit adapted to be mounted inside of a stove wall, a thermostat operably secured to said unit and arranged to extend into an oven, means interposed between said thermostat and said control unit for rendering the operation of the thermostat free from the influence of the temperature conditions in the control unit, calibrated means coupled to said thermostat and arranged outside of the oven for indicating the operating temperature of the thermostat, and means for checking said calibrations.

4. An oven regulator, comprising a heat controlling unit adapted to be mounted inside of a stove wall, a thermostat operably secured to said unit and arranged to extend into an oven, means interposed between said thermostat and said control unit for rendering the operation of the thermostat free from the influence of the temperature conditions in the control unit, calibrated means coupled to said thermostat and arranged outside of the oven for indicating the operating temperature of the thermostat, means for checking said calibrations, and means coupled to said thermostat arranged to extend on the outside of the oven for varying the action of the thermostat upon the valve.

WILLIAM J. BRENNEN.